United States Patent [19]

Burke

[11] Patent Number: 4,930,130
[45] Date of Patent: May 29, 1990

[54] BIMODAL LINEAR ACCELERATOR APPARATUS

[76] Inventor: Robert J. Burke, 1991 Rayshire St., Thousand Oaks, Calif. 91362

[21] Appl. No.: 277,158

[22] Filed: Nov. 29, 1988

[51] Int. Cl.$^5$ .............................................. H01S 3/00
[52] U.S. Cl. ......................................... 372/2; 372/37
[58] Field of Search ...................................... 372/2, 37

[56] References Cited

U.S. PATENT DOCUMENTS

| 4,287,488 | 9/1981 | Brau et al. | 372/2 |
| 4,323,857 | 4/1982 | Brau et al. | 372/2 |
| 4,455,277 | 6/1984 | Schlitt | 372/2 |
| 4,479,218 | 10/1984 | Brau et al. | 372/2 |

Primary Examiner—Léon Scott, Jr.

[57] ABSTRACT

An approach is shown for eliminating the expense of a plurality of linear accelerators as used in a multiple electron beams free electron laser system. A single linear accelerator is used to simultaneously accelerate a plurality of electron beams by using an electron beam deflection means such as a bending magnet to cause multiple beams to converge to a single stream of electrons for acceleration by the linear accelerator and then using a similar beam deflection means to re-define the accelerated beams in accordance with their repsective enery levels into a similar plurality of output beams.

7 Claims, 1 Drawing Sheet

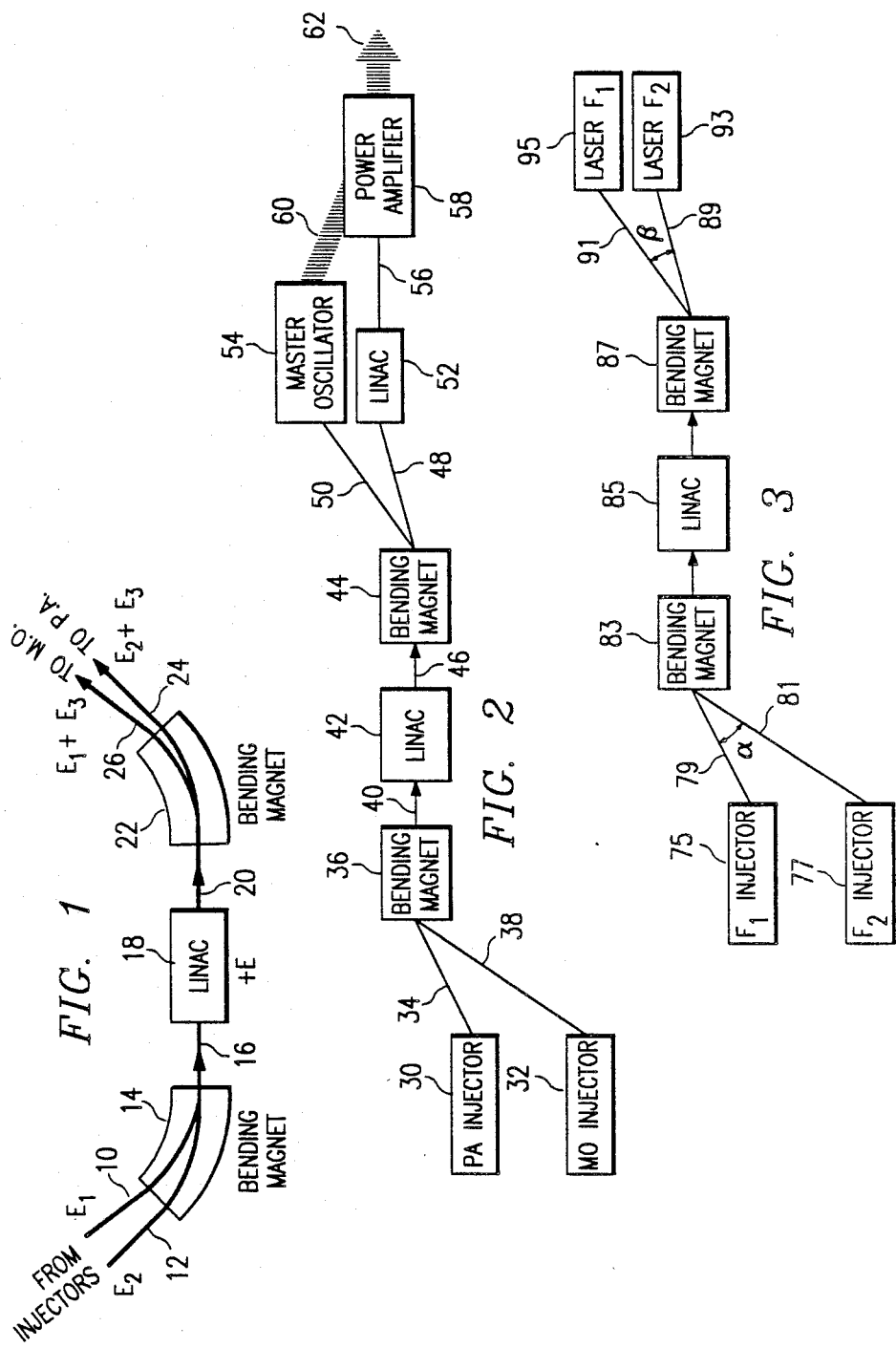

BIMODAL LINEAR ACCELERATOR APPARATUS

THE INVENTION

The present invention is generally concerned with lasers and more specifically is concerned with using a single linear accelerator for at least two sets of electron beams used in free electron laser apparatus.

BACKGROUND

High power free electron lasers of the prior art have typically used two separate linear accelerators for the two electron streams of different energy levels and other defining parameters used respectively by the master oscillator and the power amplifier. The linear accelerators are used to increase the energy of electrons used in the lasers and to thus increase the intensity of the light in the laser beam being created.

Since linear accelerators are expensive to build, it would be desirable if a way could be found to not only combine two different electron beams or streams of electrons for acceleration by a single linear electron accelerator, but to also figure out a way to separate these two electron streams for use by two separate loads at the output of the linear accelerator.

The present invention is based upon the realization by the inventor that not only can an electron beam deflecting means such as a bending magnet be used to combine two streams of electrons of different energy levels into a converging path, but that a similar deflecting means can be used to separate and redefine two separate streams of electrons at the output as long as the energy levels of the two electron beams are distinct. Since a linac adds the same incremental amount of energy to any electrons passing through, the difference in energy level of the electron beams exiting from the linac will be the same incremental amount as that received but merely will be proportionally different in energy levels. The net result is that the angle of separation of the exiting electron beams will be less than the angle of separation of the converging streams of electrons received by the initial bending magnet.

Not only can the concept be used within a single, very powerful, laser apparatus, but it can be used in situations where it is desirable to have lasers operating either at two different energy levels or at two different frequencies. The same principle of using a single linear accelerator to save cost would still apply. The end result is that for a much more economical investment, a device providing either of two lasering actions simultaneously can be produced.

It is thus an object of the present invention to provide a device for not only combining different electron streams for common acceleration, but to redefine the electron streams after they have been increased in energy levels and utilize the two electron streams in separate load type devices for a resultant laser apparatus.

Other objects and advantages will be realized from a reading of the specification and appended claims in conjunction with the drawings wherein:

FIG. 1 is a block diagram of the basic concept of the present invention;

FIG. 2 is a block diagram of the inventive concept as applied to a higher power laser device using free electron laser concepts; and FIG. 3 is a block diagram of the inventive concept as utilized in providing a total apparatus having two different laser output beams.

DETAILED DESCRIPTION

In FIG. 1 two sources of electrons El, or otherwise designated as 10, and E2, otherwise designated as 12 are received from two different sources at angles which tend to converge in the area of an electron deflection means or bending magnet 14. The magnetic forces of the bending magnet 14 react with the fields of the two electron streams represented by 10 and 12 and force or direct these to a converging path designated as 16. The path of electrons 16 is supplied to a linear accelerator, energy amplifier or linac 18 which adds an amount of energy designated as E3 to the electrons passing therethrough. The output of the linac 18 is a stream of electrons designated as 20 which is supplied to a further bending magnet or other electron deflecting means 22. The deflection capability of a given magnet is inversely proportional to the energy of the electrons being deflected. Thus, the higher energy stream E2 is deflected at a lesser angle than is the energy stream E1. The two output streams are shown respectively as 24 and 26 with stream 24 being the E2 stream having the added energy of E3 and stream 26 representing the stream of electrons E1 with the added energy supplied by linac 18 of E3. Since electron streams have both electrical and magnetic properties, they can be deflected either by electrical fields or magnetic fields. Thus, the devices 14 and 22 can be any type of electron beam deflection means that accomplishes the desired result of either first deflecting the independent streams to a converging path or deflecting the combined path to two separate paths of different energy electron streams shown as 24 and 26.

FIG. 2 shows the concept of FIG. 1 in a practical embodiment of a free electron laser where a power amplifier electron beam injector is designated as 30 and a master oscillator electron beam injector is represented as 32. The power amplifier injector 30 supplies a stream of electrons with a first set of parameters on a path designated as 34 toward a bending magnet 36. The master oscillator injector supplies a separately defined beam of electrons represented by a path 38. The beam of electrons represented by 34 have more initial energy than do the ones represented by beam 38 and thus, the stream of electrons represented by beam 34 are bent less as previously described in connection with FIG. 1. The two beams 34 and 38 thus converge to form the beam represented by a designator 40 for the electrons being accelerated by a linear accelerator such as linac 42. The output of the linac is supplied to a further bending magnet 44 via a stream of electrons represented by 46. The output of the bending magnet supplies two streams of electrons represented by 48 and 50 to a linac 52 and a master oscillator 54, respectively. The electrons entering linac 52 are supplied with more energy and supplied in a further beam represented by 56 to a power amplifier 58. A laser modulating signal is supplied from master oscillator 54 to power amplifier 58 via a light beam represented by a designator 60. The light beam 60 operates on the electrons of beam 56 to produce a high power laser beam represented by a designator 62 at the output of power amplifier 58.

The master oscillator 54 does not typically require that as much energy be added to the stream 38 as compared to the energy that may be desirable to add to stream 34 for use by power amplifier 58. Thus, linac 42 adds to the power amplifier stream of electrons 34 the amount of energy added to stream 38 for the master oscillator 54, and then further acceleration is given to the power amplifier electrons by linac 52. The cost of producing the total energy adding capacity (radio frequency power system) of a unitary device (linac) supplying the combined power of 42 and 52 is only fractionally less than the cost for this energy adding capacity of building the device so as to achieve streams 50 and 56 by two separate linacs such as 42 alone to produce stream 50 plus 42 and 52 in a contiguous configuration. However, there is a very significant cost savings in building the entire illustrated apparatus by not having to duplicate the portion of linac 42 as a separate linear accelerator just for the electron stream used by the master oscillator. As will be realized, the total combined energy expended for accelerating the electrons is substantially the same whether they be accelerated in two separate linacs or by the configuration shown in FIG. 2. The savings in this device is not in power used after construction, but merely in the elimination of the cost of producing the additional linac. As previously indicated, the bending magnets 36 and 44 are insignificant in cost as compared to the linacs and are typically produced by using simple dipole magnets.

The apparatus shown in FIG. 3 represents an application of the concept to a dual laser type apparatus where typically the user desires laser beams of two different frequencies simultaneously, although in some instances, two different power levels or both is desirable.

As shown in FIG. 3, first and second electron injectors 75 and 77 are shown supplying electron beams represented by 79 and 81 to a bending magnet 83 which supplies a converged set of electrons representing the combination of 79 and 81 to a linear accelerator or linac 85 which, after acceleration, supplies the electrons to a further bending magnet 87 which is operational to separate the beams into further beams 89 and 91 which are supplied to first and second lasers 93 and 95 as illustrated. In accordance with the previous teachings, the angle alpha is larger than the angle beta since the percentage difference between the energy levels after acceleration is less than the energy difference percentage wise before acceleration. As is known, a laser device receiving a higher energy electron beam will typically, although not necessarily, have a higher frequency of operation.

OPERATION

A high power free electron laser (FEL) must use a master oscillator/power amplifier (MOPA) configuration to avoid the power limitations imposed by heating of the mirrors in the optical resonator of the master oscillator apparatus. As previously referenced, the conventional design approach for a MOPA employs two electron linear accelerators (linacs), one for the master oscillator and another for the power amplifier. The linear accelerator system is the largest cost item in a high power FEL and thus, using two linacs for a MOPA configuration FEL is quite expensive.

It is well-known to those skilled in the art that the radius of the orbit of an electron in a magnetic field perpendicular to the velocity of the electron and the magnetic field varies with the electron's momentum, and it is also well-known that there is an essentially equal acceleration of electrons in a "beta=1" accelerator structure where the electrons are relativistic even in situations where their initial energies or final energies are not equal. These known facts are the basis of various types of accelerators including microtrons and recirculating linacs. This information is set forth in the book entitled, "Recirculating Electron Accelerators", by Roy E. Rand, copyright 1984.

A prior art concept to use a single linac for multiple beams has involved an electron beam switch at the output. Such an approach is not a satisfactory solution where the electron beam receiving devices require high electron beam current and high beam quality. The present invention uses separate sources for the input electron beams and separates these beams into distinct output streams of electrons, and thus has control over the parameters of peak current, average current, bunch length, bunch repetition rate, emittance, energy spread and kinetic energy. The capability of independent adjustment of these various parameters in the electron beams adds greatly to the versatility of the illustrated device.

Thus, the common element of the invention is illustrated in FIG. 1 where multiple beams (i.e., beams represented by 10 and 12) are operated upon by an electron beam deflection means such as a bending magnet 14 to accomplish convergence of these two beams into a single path such as 16 to be accelerated by the single linac 18 and then separated by a further deflection means such as bending magnet 22 into the two usable free electron streams 24 and 26, each of which retains its original parameters in sufficient modified form except for an amplified amount of kinetic energy.

If reference may now be made to FIG. 3, the concept of FIG. 1 is applicable in a very apparent manner to an approach to a device or apparatus for providing laser output beams of two different types such as different frequencies or different intensities, etc. It should be emphasized that these two laser beams can be supplied simultaneously if so desired.

The application of the concept of FIG. 1 to FIG. 2 again utilizes two different electron streams of different parameters designated as 34 and 38 which are deflected to a common path by bending magnet 36, accelerated to a higher energy level and then separate into streams 48 and 50 by bending magnet 44. The electron stream represented by designator 50 is of a lower energy level. This electron beam is utilized within master oscillator 54 to produce a light beam shown as 60. The electron stream represented by 48 has a further amount of energy added to it by the section of the linac designated as 52 to provide a higher energy electron stream such as designated by 56. Power amplifier 58 interacts the electron stream of 56 and the light beam 60 to produce a higher power light beam shown as 62.

As will be realized by those skilled in the art, all of the components of FIG. 2 are standard and have been utilized in other embodiments except for the use of the common linac 42 and the bending magnets 36 and 44 to first converge the electron stream for acceleration by a common linac and then separate the streams for use by the master oscillator 54 and the combination of linac 52 and power amplifier 58.

While I have shown two useful embodiments for incorporating my inventive concept, I wish to be limited not by the apparatus shown and disclosed but only by the scope of the appended claims wherein I claim:

1. A Multipurpose free electron laser apparatus comprising, in combination:
   an electron injector first means for providing a first stream of electrons at a first energy level;

an electron injector second means for providing a second stream of electrons at a second energy level which second level is higher than said first energy level;

a linear accelerator third means, including input means and output means, for increasing the energy of any electrons passing therethrough between said input means and said output means;

a bending magnet fourth means, including input means and output means, positioned and aligned between said first and second means and said third means said first stream of electrons is deflected more than said second stream of electrons and further whereby the two beams follow a common path upon exiting said fourth means at said output means thereof on the way to said third means;

a load fifth means for receiving said first stream of electrons;

a load sixth means for receiving said second stream of electrons; and a bending magnet seventh means, including input means and output means, positioned and aligned between said third means and said fifth and sixth means in a manner whereby said first stream of electrons is deflected more than said second stream of electrons and further whereby the two beams follow a common path into said seventh means while exiting in separate paths toward said fifth and sixth means in accordance with their respective beam energy levels.

2. A master oscillator/power amplifier free electron laser apparatus comprising, in combination:

a master oscillator electron injector first means for providing a first stream of electrons at a first energy level;

a power amplifier electron injector second means for providing a second stream of electrons at a second energy level which second level is higher than said first energy level;

a linear accelerator third means, including input means and output means, for increasing the momentum of any electrons passing therethrough between said input means and said output means;

a beam bending fourth means, including input means and output means, positioned and aligned between said first and second means and said third means such that said first stream of electrons is deflected more than said second stream of electrons and further whereby the two beams follow a common path upon exiting said fourth means at said output means thereof on the way to said third means;

a master oscillator fifth means for receiving said first stream of electrons and converting same to a given base frequency output light beam;

a linear accelerator sixth means for receiving said second stream of electrons and outputting said second stream of electrons at a higher energy level;

a beam bending seventh means including input means and output means, positioned and aligned between said third means and said fifth and sixth means such that said first stream of electrons is deflected more than said second stream of electrons and further whereby the two beams follow a common path into said seventh means while exiting in separate paths toward said fifth and sixth means in accordance with their respective beam energy levels; and a power amplifier eighth means, including input means and output means, for receiving said light beam and electron stream from said fifth and sixth means respectively, said eighth means providing a laser output signal having a base frequency of the beam of said master oscillator.

3. Multiple frequency laser apparatus comprising, in combination:

electron injector first means for providing a first stream of electrons at a first energy level;

electron injector second means for providing a second stream of electrons at a second energy level which second level is higher than said first energy level;

linear accelerator third means, including input means and output means, for increasing the momentum of any electrons passing therethrough between said input means and said output means by a given value;

beam bending fourth means, including input means and output means, positioned and aligned between said first and second means and said third means in a manner whereby said first stream of electrons is deflected more than said second stream of electrons and further whereby the two beams follow a common path upon exiting said fourth means at said output means thereof on the way to said third means;

laser fifth means for receiving a stream of electrons and converting same to an output light beam of a first frequency;

laser sixth means for receiving a stream of electrons and converting same to an output light beam of a second frequency; and beam bending seventh means, including input means and output means, positioned and aligned between said third means and said fifth and sixth means in a manner whereby said first stream of electrons is deflected more than said second stream of electrons and further whereby the two beams follow a common path into said seventh means while exiting in separate paths toward said fifth and sixth means in accordance with their respective beam energy levels.

4. The method of using a single linear accelerator for increasing momentum of each of a plurality of streams of electrons passing therethrough simultaneously comprising, the steps of:

simultaneously supplying a plurality of streams of electrons of different parameters to an electron beam deflection means from different angles whereby the streams of electrons are deflected in accordance with their energy levels such that the plurality of streams of electrons converge to a common path upon exiting the electron beam deflection means;

increasing the energy level of all the electrons in said common path stream by substantially the same amount through the use of a single linear accelerator to form a high energy output electron stream; and redefining a plurality of streams of electrons representative of the original plurality of streams by passing the output of the linear accelerator through a further electron beam deflection means.

5. The method of using a single linear accelerator for increasing the momentum of two separate streams of electrons passing therethrough simultaneously comprising, the steps of:

simultaneously supplying two streams of electrons of different energy levels from two different angles on converging paths;

deflecting the converging paths of the electrons whereby the stream of electrons having the most energy is deflected the least such that the two streams of electrons converge to a common path;

providing additional energy by the same incremental amount to each of the two streams of electrons passing along the common path through the use of a single linear accelerator; and deflecting the electrons exiting the linear accelerator whereby the electrons having the least energy are deflected the most thereby redefining two separate streams of electrons at two different energy levels.

6. Apparatus for using a single linear accelerator to increase momentum of two separate streams of electrons passing therethrough simultaneously comprising, in combination:

an electron beam supplying first means for simultaneously supplying two streams of electrons of different energy levels from two different angles on converging paths;

an electron beam deflecting second means situated in the vicinity of the paths of said converging beams of electrons for deflecting the electrons whereby the stream of electrons having the most energy is deflected the least such that the two streams of electrons converge to a common path and are output as a single stream of electrons;

an electron beam energy imparting third means situated in the path of said single stream of electrons for providing additional energy thereto and providing a high energy further single stream of electrons as an output; and an electron beam deflecting fourth means situated in the path of said further single stream of electrons output by said third means for deflecting the electrons exiting said third means to redefine two separate streams of electrons at two different energy levels.

7. Apparatus for allowing use of a single linear accelerator for increasing momentum of each of a plurality of streams of electrons passing therethrough simultaneously comprising, in combination:

an electron beam supplying first means for simultaneously supplying a plurality of streams of electrons of different parameters from different angles such that the streams of electrons are generally directed toward a common point of convergence;

an electron beam deflection second means, situated to receive all of said plurality of streams of electrons whereby the streams of electrons are deflected in accordance with their energy levels such that the plurality of streams of electrons converge to a common path upon exiting the electron beam deflection second means;

a linear accelerator third mean, situated in the common path of the e exiting from said second means, for increasing the energy level of all the electrons in said common path stream to form a high energy output electron stream; and an electron beam deflection fourth means, situated to receive said high energy output electron stream, for redefining said plurality of streams of electrons each representative of the original plurality of streams by passing the output of the linear accelerator through an electron beam deflection field.

* * * * *

UNITED STATES PATENT AND TRADEMARK OFFICE
CERTIFICATE OF CORRECTION

PATENT NO. : 4,930,130
DATED : May 29, 1990
INVENTOR(S) : Robert J. Burke

It is certified that error appears in the above-identified patent and that said Letters Patent is hereby corrected as shown below:

On the title page:
In the Abstract, Line 10, the word "repsective" should be --respective--.
In the Claims, as follows:

Column 6, Claim 3, Lines 7 and 9, insert the word --an-- before the word "electron"; Line 13, before the word "linear", Lines 18 and 33, before the word "beam", and Lines 27 and 30, before the word "laser", insert the word --a--; line 14, before the word "momentum", delete the word "the"; Lines 16 and 17, delete the words "by a given value"; Lines 20 and 21, and Lines 35 and 36, the words "in a manner whereby" should be replaced with --such that--.

Column 7, Claim 6, Line 16, the word "Apparatus" should be replaced with the words --an apparatus--, and the word "for" should be deleted.

Column 8, Claim 7, Line 9, the word "Apparatus" should be replaced with the words --an apparatus--, and the word "for" should be deleted.

Signed and Sealed this

Fifteenth Day of October, 1991

*Attest:*

HARRY F. MANBECK, JR.

*Attesting Officer*     *Commissioner of Patents and Trademarks*